United States Patent [19]

Biggs

[11] 4,090,038
[45] May 16, 1978

[54] AUDIO SIGNAL ON HOLD CIRCUIT

[75] Inventor: Ronald Dee Biggs, Zionsville, Ind.

[73] Assignee: Bell Telephone Laboratories, Incorporated, Murray Hill, N.J.

[21] Appl. No.: 815,569

[22] Filed: Jul. 14, 1977

[51] Int. Cl.² ............................................. H04M 1/72
[52] U.S. Cl. .................................... 179/99; 179/81 R
[58] Field of Search ....................... 179/81 R, 84 R, 99

[56] References Cited

U.S. PATENT DOCUMENTS

| 3,246,082 | 4/1966 | Levy ................................. 179/2 R |
| 3,794,774 | 2/1974 | Kemmerly et al. .................... 179/99 |
| 3,909,553 | 9/1975 | Marshall ............................... 179/99 |
| 3,965,308 | 6/1976 | Jones et al. ........................... 179/99 |
| 4,056,695 | 11/1977 | Angner et al. ......................... 179/99 |

*Primary Examiner*—Kathleen H. Claffy
*Assistant Examiner*—Randall P. Myers
*Attorney, Agent, or Firm*—Harry L. Newman

[57] ABSTRACT

The electrical signals generated by an audio source are applied to a plurality of series connected light emitting diodes which are illuminated responsive to the signals. The light emitting diodes are respectively optically coupled to individual phototransistors, each of which is connected in series with a resistor across the hold impedances of the hold circuit of an individual telephone line. When one of the hold impedances is connected across its associated telephone line, line current flows through the hold impedances. Line current also flows through the parallel resistor when the phototransistor is turned on responsive to the illumination of its associated light emitting diode. The phototransistor thus modulates the current flow through the hold impedances to provide an audio signal output on the held line.

5 Claims, 1 Drawing Figure

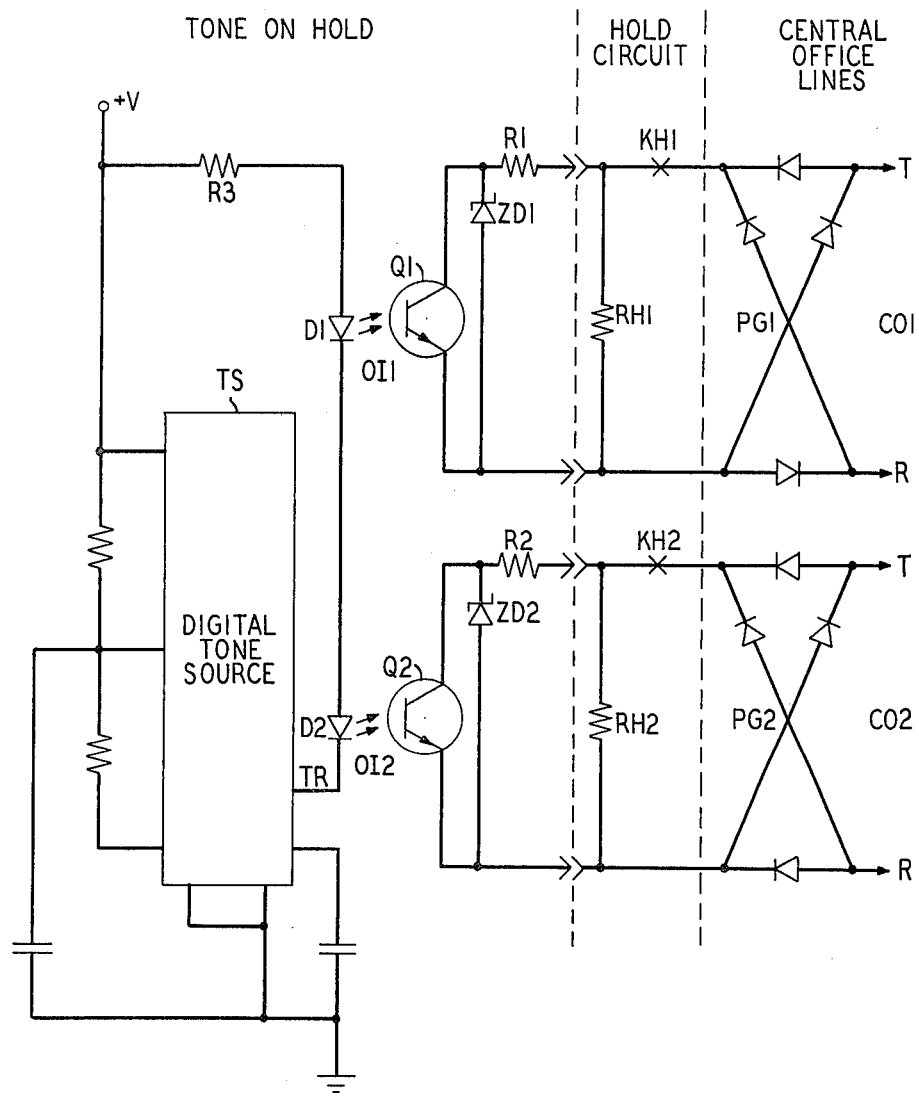

AUDIO SIGNAL ON HOLD CIRCUIT

FIELD OF THE INVENTION

This invention relates to hold circuits of the type used in key telephone systems and more specifically to a circuit for providing an audible feedback signal to a telephone user that has been placed on hold.

BACKGROUND OF THE INVENTION

Key telephone systems were developed to permit a single telephone to have access to a number of telephone and intercom lines. They also permit the telephone to be temporarily disconnected from a telephone line on which a call is in progress and still maintain a connection with the distant party. This is typically accomplished by means of a hold resistor that simulates the electrical impedance of the speech network of the telephone and is connected in shunt with the telephone prior to the telephone being disconnected from the line. This arrangement, however, leaves the distant party with what appears to be and is indistinguishable from a dead line. Therefore, a number of arrangements have been devised for applying music or a tone signal to the held line.

Those arrangements that have been made the subject of a patent are disclosed in U.S. Pat. No. 3,246,082 issued to A. Levy on Apr. 12, 1966, U.S. Pat. No. 3,794,774 issued to R. C. Kemmerly et al. on Feb. 26, 1974, and U.S. Pat. No. 3,909,553 issued to R. A. Marshall on Sept. 30, 1975. In addition, co-pending patent application Ser. No. 708,858, filed July 28, 1976, now U.S. Pat. No. 4,056,695, in the name of R. J. Angner and J. V. Lacy is directed to such an arrangement. In each of these arrangements in order to provide isolation between the audio signal source and the telephone line, the audio signal is inductively coupled to the telephone line when the line is in the hold condition.

Inductive coupling, however, introduces the possibility of cross talk between lines that are in the hold condition at the same time. This is because, as shown in the above-mentioned Kemmerly et al. patent, for reasons of economy it is necessary to use the same audio source for a multiplicity of telephone lines, the audio source being inductively coupled to each of these lines. Thus, when more than one line is on hold at the same time, a talking path is provided between the parties that are on hold.

SUMMARY OF THE INVENTION

The arrangement of the present invention eliminates the possibility of cross talk between parties on hold. In addition, this is achieved by replacing the relatively bulky and expensive multiplicity of transformers that are used in most of the above-noted patent arrangements by relatively inexpensive components that permit further cost reduction when used in conjunction with an audio source comprising an integrated digital tone generator.

In accordance with the present invention, the electrical signal generated by the audio source is applied to a plurality of series-connected light emitting diodes (LEDs) which are illuminated responsive to the signal. The LEDs are respectively optically coupled to individual phototransistors, each of which is connected in series with a resistor across the hold impedance of the hold circuit of an individual telephone line. When one of the hold impedances is connected across its associated telephone line, line current flows through the hold impedance. Line current also flows through the parallel phototransistor when it is turned on responsive to the illumination of its associated LED. The phototransistor, thus modulates the current flow through the hold impedance to provide an audio signal output on the held line. A zener diode connected in parallel with each phototransistor shunts part of the current when the voltage across the hold resistor exceeds a particular threshold. The signal output on short and long loops is thereby made more uniform.

DETAILED DESCRIPTION OF THE DRAWING

The single FIGURE of the drawing comprises a schematic diagram of a circuit in accordance with the present invention.

DETAILED DESCRIPTION OF THE INVENTION

Referring to the drawing, a tone on hold circuit exemplary of the present invention includes a digital tone source TS. Such a tone source is disclosed in the previously referred to co-pending patent application of R. J. Angner and J. V. Lacy. This tone source generates a 1024 Hertz tone with a signal duration of 500 milliseconds on, 125 milliseconds off, and 125 milliseconds on. The period of repetition is 4 seconds.

The tone source TS provides these digital tone bursts by an open transistor collector output (not shown) on lead TR. Two light emitting diodes D1 and D2 are connected in series with this transistor and with a current limiting resistor R3 and constant voltage power supply (+). The light emitting diodes D1 and D2 are respectively optically coupled to phototransistors Q1 and Q2 and in combination with the phototransistors comprise optical isolators OI1 and OI2.

The phototransistors Q1 and Q2 are respectively associated with central office lines CO1 and CO2, and since the related circuitry for each line is identical, only the first will be described, the comparable components of the second line being designated with the same letters followed by the numeral 2. The central office line CO1 includes a polarity guide PG1 and a hold bridge connected across the guarded side of PG1. The hold bridge comprises a pair of normally open hold contacts KH1 in series with a hold resistor RH1, and the phototransistor Q1 is connected in parallel with the hold resistor. In addition, the phototransistor Q1 is connected in series with a resistor R1 and has a zener diode ZD1 connected in parallel therewith.

When, for example, the central office line CO1 is placed on hold, the hold contacts KH1 are closed to connect the hold resistor RH1 across the telephone line. A line current path is thereby provided that maintains the central office connection to the distant party when the local station set disconnects from the telephone line. Each time a tone burst is generated by the digital tone source TS, the light emitting diodes D1 and D2 are turned on and off at the same frequency. The phototransistor Q1 is thereby turned on and off responsive to the light emitting diode D1, the proper polarity being provided by the polarity guard PG1. Each time the phototransistor Q1 is turned on, the resistor R1 is connected in parallel with the hold resistor RH1, and the resistance bridging the held line is reduced. Thus, the normal voltage on the hold resistor RH1 is modulated by the output of the tone source TS to provide a tone signal on the held line.

The amplitude of the signal is controlled by the value of the resistor R1. The zener diode ZD1 serves to shunt part of the current when the voltage across the hold resistor exceeds a particular value. The signal output on short and long loops is thereby made more uniform. The zener diode ZD1 also provides surge protection for the phototransistor Q1, the resistor R1 limiting the zener diode surge current.

It is seen that when both lines are on hold, there is no possibility of cross talk between lines because the optical isolators OI1 and OI2, unlike the transformers disclosed in the prior art, are unidirectional. In addition, the optical isolators OI1 and OI2 provide a minimum of 2500 volt breakdown between the central office lines and the control circuit. Finally, the optical isolators OI1 and OI2 are less expensive than the transformers, capacitors and other circuitry required by the prior art circuits.

Although but one embodiment has been described in detail, it is to be understood that it is merely illustrative of the principles of the invention. Various modifications may be made thereto by persons skilled in the art without departing from the spirit and scope of the invention.

What is claimed is:

1. An audio signal on hold circuit for use with a hold bridge including an impedance that is connected across an associated telephone line when the line is placed on hold, the circuit comprising;

an audio source;

a light emitting diode connected to the audio source and energized responsive thereto; and the combination of a phototransistor optically coupled to the light emitting diode and an impedance connected in series with the phototransistor, the combination adapted to be connected in parallel with the hold bridge impedance, whereby the current flowing through the hold bridge impedance when the line is placed on hold is modulated by the current flow through the impedance in series with the phototransistor responsive to the signal output of the audio source to provide a corresponding audio signal to the line.

2. An audio signal on hold circuit as in claim 1 wherein a zener diode is connected in parallel with the phototransistor to provide protection to the phototransistor from current surges and to provide equalization of the audio signal on long and short loops.

3. An audio signal on hold circuit as in claim 1 wherein the audio source comprises a digital tone generator.

4. An audio signal on hold circuit as in claim 1 wherein a plurality of series connected light emitting diodes are energized responsive to the audio source and each light emitting diode is optically coupled to an individual phototransistor that is connected in series with an impedance and is adapted to be connected in parallel with the impedance of the hold bridge of an individual telephone line.

5. An audio signal on hold circuit as in claim 4 wherein a zener diode is connected in parallel with each phototransistor to provide protection to the phototransistor from current surges and to provide equalization of the audio signal on long and short loops, the series impedances limiting the zener diode surge current and providing the desired amplitude for the audio signal.

* * * * *

UNITED STATES PATENT AND TRADEMARK OFFICE
CERTIFICATE OF CORRECTION

PATENT NO. : 4,090,038
DATED : May 16, 1978
INVENTOR(S) : Ronald D. Biggs

It is certified that error appears in the above-identified patent and that said Letters Patent are hereby corrected as shown below:

Column 2, line 33, "(+)" should read --(+V)--.
Column 3, line 14, after "breakdown" insert --isolation--.

Signed and Sealed this

Twelfth Day of December 1978

[SEAL]

Attest:

RUTH C. MASON
Attesting Officer

DONALD W. BANNER
Commissioner of Patents and Trademarks